United States Patent
Ohshima et al.

(10) Patent No.: US 7,119,950 B2
(45) Date of Patent: Oct. 10, 2006

(54) AMPLIFICATION METHOD AND OPTICAL AMPLIFIER FOR WAVELENGTH DIVISION MULTIPLEXED SIGNAL LIGHT

(75) Inventors: Chihiro Ohshima, Kawasaki (JP); Etsuko Hayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/085,082

(22) Filed: Mar. 22, 2005

(65) Prior Publication Data

US 2006/0023298 A1 Feb. 2, 2006

(30) Foreign Application Priority Data

Jul. 28, 2004 (JP) ............................. 2004-220296
Jan. 21, 2005 (JP) ............................. 2005-013994

(51) Int. Cl.
*H01S 3/00* (2006.01)

(52) U.S. Cl. ................................. 359/349; 359/337.11

(58) Field of Classification Search ............. 359/337.1, 359/337.11, 349
See application file for complete search history.

(56) References Cited

U.S. PATENT DOCUMENTS 6,307,668 B1 * 10/2001 Bastien et al. ........... 359/337.1
6,885,499 B1 * 4/2005 Hoshida et al. ............. 359/337

FOREIGN PATENT DOCUMENTS

JP 2001-53686 2/2001
JP 2002-57389 2/2002

* cited by examiner

*Primary Examiner*—Mark Hellner
(74) *Attorney, Agent, or Firm*—Staas & Halsey LLP

(57) ABSTRACT

In an optical amplifier of the invention, a WDM signal light is separated into N components by a demultiplexer after which each component is amplified by N optical amplifier sections, and the output light level of each optical amplifier section is controlled to a constant level by respective control circuits and multiplexed in a multiplexer. At this time, in the demultiplexer, the bandwidth of the signal light output from each of the output ports is designed to have a different value, so that inter-wavelength deviation in the optical output level that occurs in each of the optical amplifier sections, falls within a preset range. Moreover, the constant output control of each control circuit is performed by individually adjusting the gain of each of the optical amplifier sections in relation to fluctuations in the power level without channel number changes of the WDM signal light input to the demultiplexer. As a result, deviation in the optical output level over the entire wavelength bandwidth of the WDM signal light for fluctuations in the input level of the WDM signal light, can be suppressed to a minimum, with a simple configuration.

18 Claims, 9 Drawing Sheets

CHARACTERISTIC EXAMPLE
IN CONVENTIONAL CONFIGURATION

RELATED ART

FIG.16

RELATED ART

FIG.17

RELATED ART

AMPLIFICATION METHOD AND OPTICAL AMPLIFIER FOR WAVELENGTH DIVISION MULTIPLEXED SIGNAL LIGHT

BACKGROUND OF THE INVENTION

1. Field of the Invention

The present invention relates to a method of and an optical amplifier for amplifying wavelength division multiplexed (WDM) signal light including a plurality of signal channels of different wavelengths, and in particular relates to an optical amplification technique for reducing a deviation in optical output level that occurs between signal channels of each wavelength, due to variations in optical input level.

2. Description of the Related Art

A WDM optical transmission system is operated with signal channels according to the demand for traffic transmission capacity. Usually, the number of signal channels at the start of operation is set to be comparatively few, and the signal channels are increased according to an increase in demand, to expand the transmission capacity.

The optical amplifier (hereafter, also referred to as WDM optical amplifier) used for the above mentioned WDM optical transmission system generally must have the following basic capabilities (1) to (3):

(1) Low output level deviation (flat gain wavelength characteristic)

(2) Wide input dynamic range capable of corresponding to differences in transmission distance or loss on the transmission path (3) Low noise figure (NF) characteristic.

Conventionally, a WDM optical amplifier is designed to have these basic capabilities, and so as to acquire the required optical output power when the number of input signal channels is a maximum. Specifically, as shown for example in FIG. 15, a configuration is known in which a variable optical attenuator (VOA) 103 is connected between the stages of a two-stage configuration of optical amplifier sections 101 and 102 (for example, erbium doped fiber amplifiers (EDFA) or the like) which are capable of collectively amplifying signal channels of all wavelengths, and the attenuation of the variable optical attenuator 103 is adjusted so that the total power of the WDM signal light output from the post-stage optical amplifier section 102 becomes constant.

Figure 16:
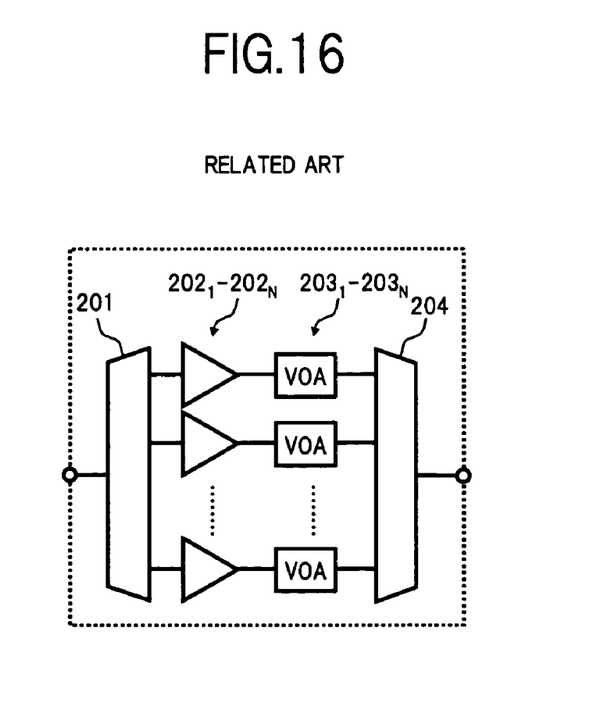
FIG. 16 is a block diagram showing another configuration example of a conventional WDM optical amplifier.

Moreover, as shown in FIG. 16, a configuration has also been proposed in which a WDM signal light input to a WDM optical amplifier is demultiplexed into a plurality of wavelength bandwidths using a demultiplexer 201, and signal light of each wavelength bandwidth is amplified in corresponding optical amplifier sections $202_1$ to $202_N$, and then the optical output power is adjusted in variable optical attenuators (VOA) $203_1$ to $203_N$, and each signal light output from each of the variable optical attenuators $203_1$ to $203_N$ is multiplexed using a multiplexer 204 (for example, see Japanese Unexamined Patent Publication No. 2002-57389, and Japanese Unexamined Patent Publication No. 2001-53686).

Figure 15:
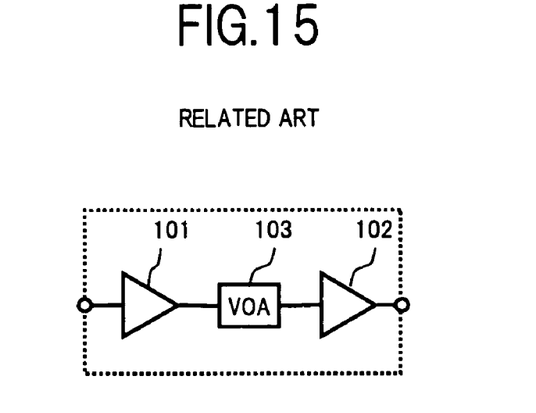
FIG. 15 is a block diagram showing a configuration example of a conventional WDM optical amplifier.

Incidentally, in a conventional WDM optical amplifier such as shown in FIG. 15, since the pumping light power required in the optical amplifier sections 101 and 102 increases as the number of signal channels increases, it is necessary to mount a pumping light source of large output capacity in order to collectively amplify all signal channels. However, since a pumping light source of large output capacity is expensive, there is a drawback in that a WDM optical amplifier equipped with such a pumping light source becomes a high-cost product.

Figure 17:
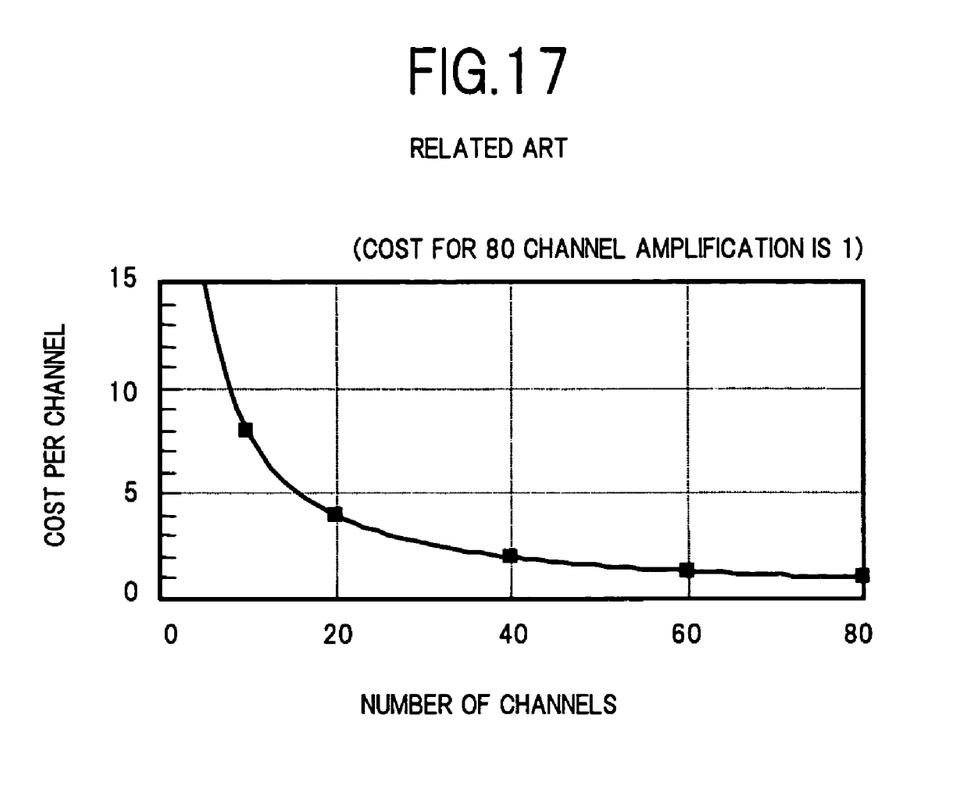
FIG. 17 is a graph showing one example of equipment cost versus number of operating channels, for a conventional WDM optical amplifier.

Moreover, the aforementioned WDM optical amplifiers as shown in FIG. 15 and FIG. 16 are usually also used in an operating condition where the number of signal channels in the WDM optical transmission system are few. Therefore, in a WDM optical transmission system that performs multiple repeatedly transmission using a conventional WDM optical amplifier, in the case where operation with few signal channels at the time of the initial implementation is assumed, then as shown in FIG. 17, this becomes a product for which the equipment cost per number of operation channels is comparatively high. As a result, there is a problem in that for a client who purchases the WDM optical transmission system, in a system that uses a conventional WDM optical amplifier cost at the time of initial implementation is high, and capitalization is not cost effective in an operating condition where transmission capacity is low. In addition, if the expected maximum transmission capacity is predicted incorrectly at the time of initial implementation, there is a possibility of having an operating condition where the maximum number of transmittable signal channels is not reached, and the client carries the risk of excessive capital investment. In the future, as densification technology for WDM signal light advances, the total output power of the WDM optical amplifier will become greater requiring considerable pumping light power. Therefore the risk mentioned above is expected to become more prominent.

Furthermore, in relation to the aforementioned configuration of the conventional WDM optical amplifier as shown in FIG. 16, there has been a problem in that the variable optical attenuators $203_1$ to $203_N$ are provided individually corresponding to each wavelength bandwidth in order to make the signal light power of the respective wavelength bands which have been demultiplexed in the demultiplexer 201 and respectively amplified in each of the optical amplifier sections $202_1$ to $202_N$, constant at a desired level to acquire a flat wavelength characteristic. Therefore the configuration becomes complex which causes an increase in cost. In relation to this problem, for example, instead of providing each of the variable optical attenuators $203_1$ to $203_N$, it is also considered to adjust the gain of each of the optical amplifier sections $202_1$ to $202_N$ so as to control the signal light power of each bandwidth to become a constant level. However, in this case, if constant output control is performed in relation to fluctuations in the total power of the WDM signal light input to the WDM optical amplifier (input dynamic range) by adjusting the gain of each of the optical amplifier sections $202_1$ to $202_N$, the gain wavelength characteristic of each of the optical amplifier sections $202_1$ to $202_N$ respectively changes. Hence the deviation in optical output level over the entire wavelength bandwidth of the WDM signal light becomes greater. Therefore, there is a problem in that it becomes difficult to satisfy fully the aforementioned basic capabilities (1) and (2).

SUMMARY OF THE INVENTION

The present invention has been accomplished in view of the above problems, and it is an object of the present invention to realize an amplification method for WDM signal light that can suppress to a minimum the deviation in the optical output level over the entire wavelength bandwidth of the WDM signal light for fluctuations in the input level of WDM signal light, with a simple configuration, and to provide a low cost optical amplifier.

In order to achieve the object, an optical amplification method of the present invention is an optical amplification method which: separates a WDM signal light including a plurality of signal channels of different wavelengths into signal lights of at least two wavelength bandwidths by a demultiplexer; amplifies each of the separated signal lights of each wavelength bandwidth by optical amplifier sections corresponding to each wavelength bandwidth; controls the total power of the signal lights output from each of the amplifier sections to be constant at a preset level; and multiplexes the constant output controlled signal lights of each wavelength bandwidth by a multiplexer. This optical amplification method involves designing the bandwidth of the signal light output from each output port of the demultiplexer to have a different value in accordance with the gain wavelength characteristics of each of the optical amplifier sections, so that inter-wavelength deviation in optical output levels that occurs in each of the optical amplifier sections falls within a preset range, and individually adjusting the gain of each of the optical amplifier sections in relation to fluctuations in the power level without channel number changes of the WDM signal light input to the demultiplexer, so that the signal level of each wavelength of the WDM signal light that is multiplexed by the multiplexer is within a preset range.

Moreover, the optical amplifier of the present invention is provided with: a demultiplexer that separates a WDM signal light including a plurality of signal channels of different wavelengths into signal lights of at least two wavelength bandwidths, and respectively outputs them from output ports corresponding to each of the wavelength bandwidths; a plurality of optical amplifier sections that respectively amplify signal lights output from each output port of the demultiplexer; a multiplexer that multiplexes signal lights output from each of the optical amplifier sections; and a plurality of control sections that control the total power of the signal light output from each of the optical amplifier sections to be constant at a preset level. As for the demultiplexer, the bandwidth of the signal light output from each of the output ports is designed to have a different value according to the gain wavelength characteristics of each of the optical amplifier sections, so that inter-wavelength deviation in the optical output level that occurs in each of the optical amplifier sections, falls within a preset range. Each of the control sections individually adjusts the gain of each of the optical amplifier sections in relation to fluctuations in the power level without channel number changes of the WDM signal light input to the demultiplexer, to thereby make the signal level of each wavelength of the WDM signal light that is multiplexed by the multiplexer, be within a preset range.

In the aforementioned amplification method and optical amplifier for WDM signal light, a WDM signal light is input to the demultiplexer, so that it is separated into at least two wavelength bandwidths where the bandwidths are optimized according to the gain wavelength characteristic of each optical amplifier section, and output from each of the output ports to each optical amplifier, and after being amplified in each of the optical amplifier sections, the amplified signal lights are sent to a multiplexer and again multiplexed into a WDM signal light. At this time, constant output control is performed in which the signal level of each wavelength of the WDM signal light multiplexed by the multiplexer is made to be within a preset range, by individually adjusting the setting of the gain of each optical amplifier section.

As described above, according to the amplification method and optical amplifier for WDM signal light of the present invention, by optimizing the bandwidth of the signal light output from each output port of the demultiplexer according to the gain wavelength characteristic of each optical amplifier section, and by adjusting the gain of each optical amplifier section corresponding to the fluctuations in input level of the WDM signal light, an amplified output in which level deviation over the entire wavelength bandwidth of the WDM signal light is suppressed can be obtained, with a simple configuration that does not require a variable optical attenuator or the like for level adjustment.

Other objects, features and advantages of the present invention will become apparent from the following description of the embodiments, in conjunction with the appended drawings.

DETAILED DESCRIPTION OF THE INVENTION

There will be described embodiments for implementing an optical amplifier of the present invention, with reference to the accompanying drawings. The same reference symbols denote the same or equivalent parts in all drawings.

Figure 1:
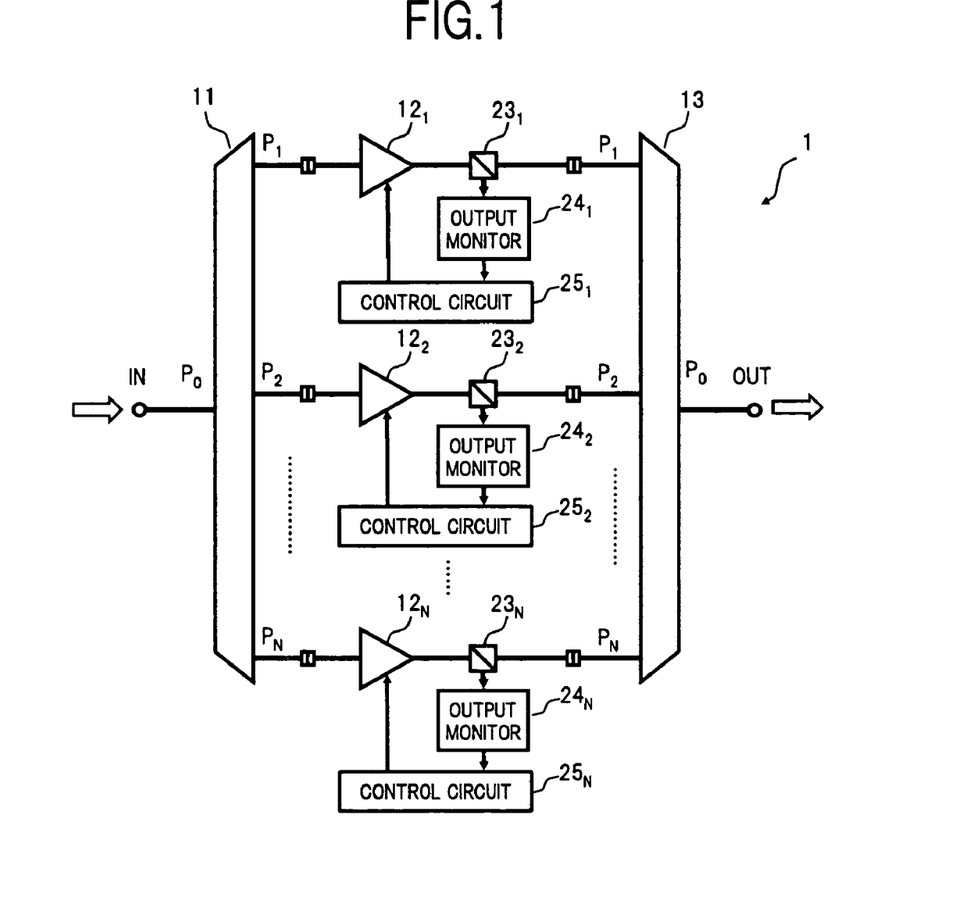
FIG. 1 is a block diagram showing a configuration of an optical amplifier according to a first embodiment of the present invention.

FIG. 1 is a block diagram showing a configuration of an optical amplifier according to a first embodiment of the present invention.

In FIG. 1, an optical amplifier 1 of the first embodiment is provided, for example, with: a demultiplexer 11 that separates WDM signal light provided to an input terminal IN into N wavelength bandwidths (where $N \geq 2$); N optical amplifier sections $12_1$ to $12_N$ respectively connected to output ports $P_1$ to $P_N$ of the demultiplexer 11; and a multiplexer 13 that multiplexes output light from each of the optical amplifier sections $12_1$ to $12_N$. Also, each of the optical amplifier sections $12_1$ to $12_N$, is provided with; optical couplers $23_1$ to $23_N$ that branch a part of each of the output lights, output monitors $24_1$ to $24_N$ that measure the power of the light branched by the optical couplers $23_1$ to $23_N$, and control circuits $25_1$ to $25_N$ that individually adjust the gain in each of the optical amplifier sections $12_1$ to $12_N$, based on the measured value of each of the output monitors $24_1$ to $24_N$. In such a configuration, the optical couplers $23_1$ to $23_N$, the output monitors $24_1$ to $24_N$, and the control circuits $25_1$ to $25_N$ function as a plurality of control sections.

Figure 2:
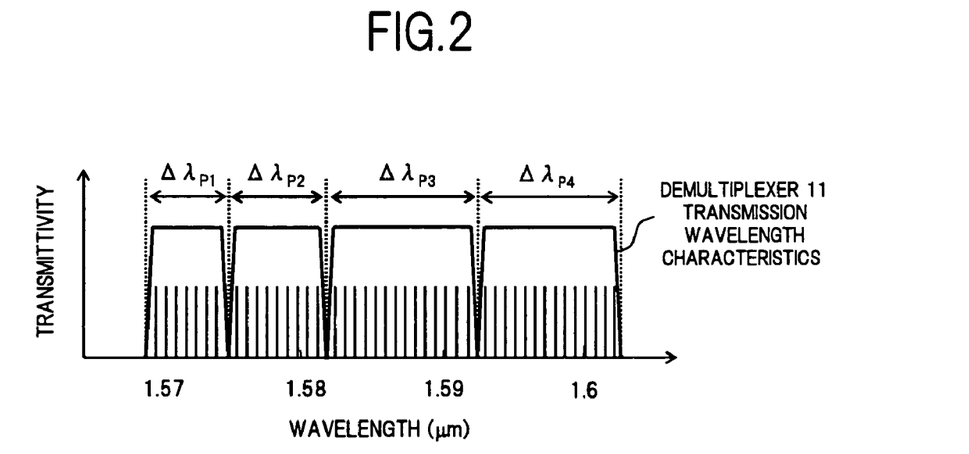
FIG. 2 is a graph showing one example of a transmission band corresponding to each output port of a demultiplexer in the first embodiment.

In the demultiplexer 11, the WDM signal light that is input to the input terminal IN is provided to an input port $P_0$, and thus the WDM signal light is separated into N signal lights of different wavelength bandwidths, and the signal light of each wavelength bandwidth is respectively output from the corresponding output ports $P_1$ to $P_N$. The demultiplexing characteristic of this demultiplexer 11 (transmission wavelength characteristic) is pre-designed so that values of bandwidths $\Delta\lambda_{P1}$ to $\Delta\lambda_{PN}$ of the signal light output from the output ports $P_1$ to $P_N$ are different, as shown for example in FIG. 2 (where N=4). As described in detail later, each of the bandwidths $\Delta\lambda_{P1}$ to $\Delta\lambda_{PN}$ is individually set according to the gain wavelength characteristic of each optical amplifier section $12_1$ to $12_N$ so that deviation in the optical output level over the entire wavelength bandwidth of the WDM signal light output from the optical amplifier 1 falls within a preset range.

Each of the optical amplifier sections $12_1$ to $12_N$ is configured using a known optical amplifier having an amplification bandwidth that includes the wavelength bandwidth of the signal light output from each of the output ports $P_1$ to $P_N$ of the demultiplexer 11. The signal lights output from each of the optical amplifier sections $12_1$ to $12_N$ are sent to each of the input ports $P_1'$ to $P_N'$ corresponding to the multiplexer 13, via the optical couplers $23_1$ to $23_N$. Here each of the optical amplifier sections $12_1$ to $12_N$ and each of the optical couplers $23_1$ to $23_N$ are provided in a detachable condition, for example via connectors, on the optical paths between each of the output ports $P_1$ to $P_N$ of the demultiplexer 11 and each of the input ports $P_1'$ to $P_N'$ of the multiplexer 13. Gain setting in each of the optical amplifier sections $12_1$ to $12_N$ is individually controlled in accordance with the control signals from each of the control circuits $25_1$ to $25_N$, and constant output control is performed by each of the optical amplifier sections $12_1$ to $12_N$ in relation to fluctuations in the total power without channel number changes of the WDM signal light input to the demultiplexer 11 as described later. Specific examples of each of the optical amplifier sections $12_1$ to $12_N$ include; a rare-earth-doped optical fiber amplifier, a semiconductor optical amplifier (SOA) or the like.

In the multiplexer 13, the signal lights respectively output from each of the optical amplifier sections $12_1$ to $12_N$ are provided to the input port $P_1'$ to $P_N'$, and each signal light is combined and output from an output port $P_0'$.

Here, the bandwidths $\Delta\lambda_{P1}$ to $\Delta\lambda_{PN}$ of the signal lights output from each of the output ports $P_1$ to $P_N$ of the demultiplexer 11 is described in detail.

Figure 3:
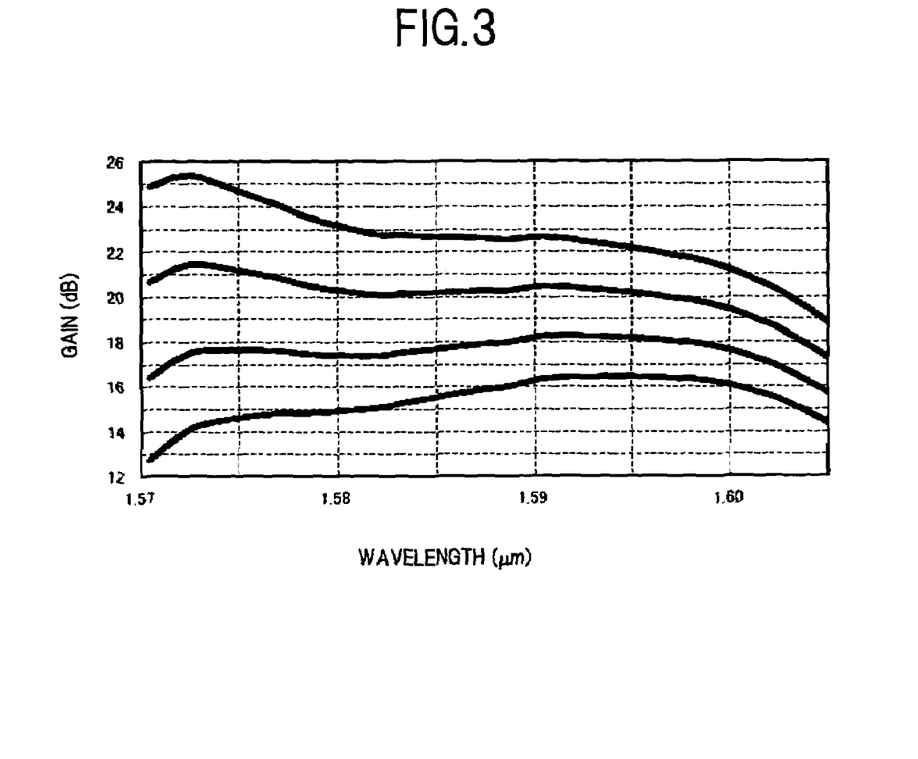
FIG. 3 is a graph showing one example of gain wavelength characteristics of an EDFA used for each optical amplifier section in the first embodiment.

As described above, each of the bandwidths $\Delta\lambda_{P1}$ to $\Delta\lambda_{PN}$ of the demultiplexer 11 is set according to the gain wavelength characteristic of each of the optical amplifier sections $12_1$ to $12_N$ so that inter-wavelength deviation in the optical output level of the optical amplifier 1 falls within the preset range. Specifically, when for example erbium-doped fiber amplifiers (EDFAs) are employed as each of the optical amplifier sections $12_1$ to $12_N$, then as shown in FIG. 3 the gain wavelength characteristic changes according to the gain setting, that is, it changes according to a population inversion status determined by the supply power of the pumping light to the erbium-doped fiber, being the amplification medium. In the example of FIG. 3, when the gain setting is comparatively low the gain on the long wavelength side around 1.59 μm becomes higher than the gain on the short wavelength side around 1.58 μm, while when the gain setting is comparatively high, the gain on the long wavelength side around 1.59 μm becomes lower than the gain on the short wavelength side around 1.58 μm.

Regarding change in gain wavelength characteristics according to this kind of gain setting, when the optical output level is controlled to be constant by adjusting each gain in relation to the change in optical input level of the signal light input to each of the optical amplifier sections $12_1$ to $12_N$, there is the possibility that deviations in the respective optical output levels that occur in each of the optical amplifier sections $12_1$ to $12_N$ may come to be different to each other. That is to say, in the above mentioned conventional configuration shown in FIG. 16, WDM signal light input to an optical amplifier is separated by a demultiplexer into a plurality of signal lights having the same bandwidth. Therefore, when in the above manner, the gain of each optical amplifier section is adjusted according to the optical input level to perform constant output control of each of the optical amplifier sections, the slope of the change in gain of each optical amplifier section comes to be different. Therefore deviation in the optical output level that occurs in wavelength bandwidths of the same width is different for each wavelength bandwidth.

Figure 4:
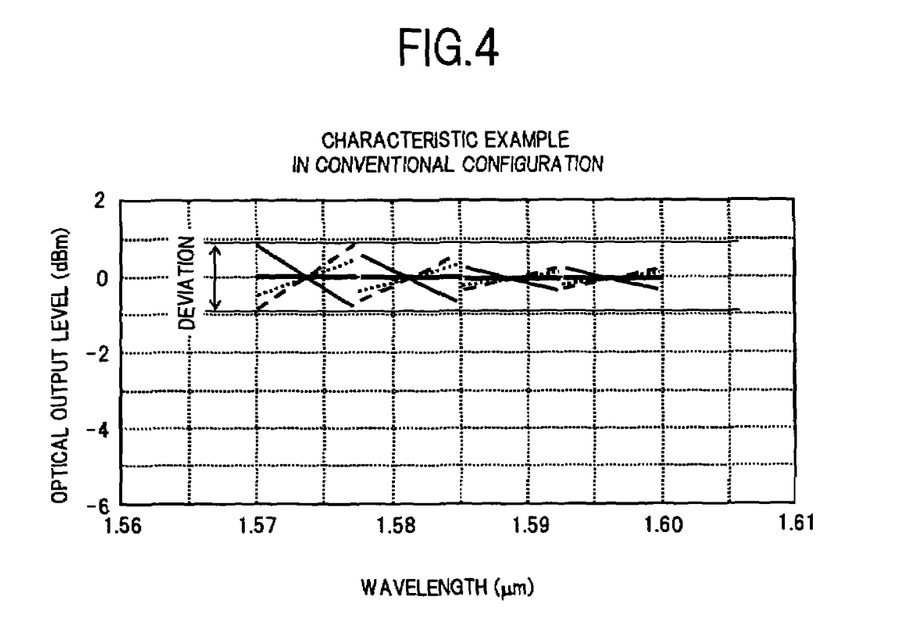
FIG. 4 is a graph showing one example of inter-wavelength deviation in the optical output level in a conventional optical amplifier that performs demultiplexing of a WDM signal light at the same wavelength bandwidth.

FIG. 4 is a graph showing one example of deviation in the optical output level in a conventional configuration in which demultiplexing of a WDM signal light is performed in the same bandwidth, corresponding to the aforementioned gain wavelength characteristics of FIG. 3. Here, a reference condition (heavy line in the graph) is assumed in which the deviation in the optical output level is substantially zero in setting of the gain corresponding to a certain optical input level (reference level), and deviation in the optical output level that occurs when the optical input level decreases with respect to the reference condition (thin line in the graph), and deviation in the optical output level that occurs when the optical input level increases (dotted line and broken line in the graph) are schematically shown.

In this example of FIG. 4, although the deviation in the optical output level that occurs in the optical amplifier section on the long wavelength side is kept comparatively small, the deviation in the optical output level that occurs in the optical amplifier section on the short wavelength side is large compared to that on the long wavelength side, showing that it is difficult to control the deviation in the optical output level that occurs over the entire wavelength bandwidth of WDM signal light, to be within the required range. Therefore, in a conventional WDM optical amplifier, a variable optical attenuator or the like for level adjustment is respectively provided on the optical path corresponding to each wavelength bandwidth after demultiplexing, in order to individually control the inter-wavelength deviation in each optical output level.

Figure 5:
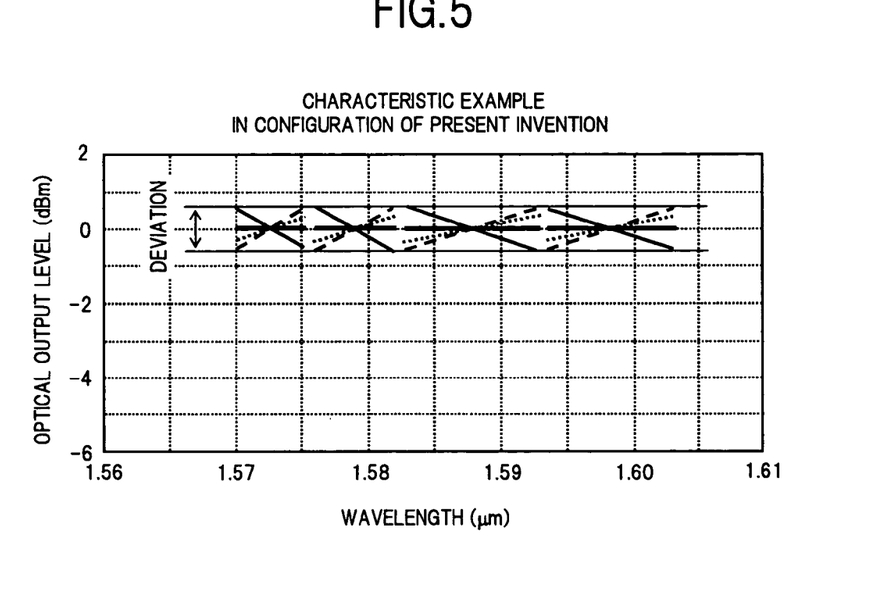
FIG. 5 is a graph showing one example of inter-wavelength deviation in the optical output level in the optical amplifier of the first embodiment.

On the other hand, in the present embodiment, the bandwidths $\Delta\lambda_{P1}$ to $\Delta\lambda_{PN}$ of the signal light output from each of the output ports $P_1$ to $P_N$ of the demultiplexer 11 are not made to be of the same width as heretofore, but information relating to the gain wavelength characteristic of each of the optical amplifier sections $12_1$ to $12_N$ is acquired beforehand, and based on that information, individual bandwidths $\Delta\lambda_{P1}$ to $\Delta\lambda_{PN}$ are optimized so that the deviation in optical output level that occurs in each wavelength bandwidth falls within the preset range. Specifically, when an EDFA having the aforementioned gain wavelength characteristics shown in FIG. 3 is used for each of the optical amplifier sections $12_1$ to $12_N$, then for example as shown in FIG. 5, the bandwidth on the short wavelength side where the change in the gain wavelength characteristic is large is relatively narrowed, and the bandwidth on the long wavelength side where the change in the gain wavelength characteristic is small is relatively widened, so that the deviation in the optical output level that occurs over the entire wavelength bandwidth of the WDM signal light is suppressed to approximately 1 dB. In this way, by individually optimizing the bandwidths $\Delta\lambda_{P1}$ to $\Delta\lambda_{PN}$ of the signal light output from each of the output ports $P_1$ to $P_N$ of the demultiplexer 11, the conventional variable optical attenuator for level adjustment can be omitted.

Next, operation of the optical amplifier 1 of the first embodiment is described.

In the optical amplifier 1 configured as described above, the WDM signal light input to the input terminal IN is sent to the demultiplexer 11. The WDM signal light provided to the input port $P_0$ of the demultiplexer 11 is separated into N signal lights according to the aforementioned transmission wavelength characteristics shown in FIG. 2, and is output from each of the output ports $P_1$ to $P_N$. The output lights from each of the output ports $P_1$ to $P_N$ of the demultiplexer 11 are sent to each of the optical amplifier sections $12_1$ to $12_N$ and respectively amplified. The signal lights output from each of the optical amplifier sections $12_1$ to $12_N$ are sent to the multiplexer 13 via the optical couplers $23_1$ to $23_N$, and one part thereof is branched at the optical couplers $23_1$ to $23_N$ and sent to output monitors $24_1$ to $24_N$. The signal lights provided to each of the input ports $P_1'$ to $P_N'$ of the multiplexer 13 are recombined into a single WDM signal light, and output from the output terminal OUT.

In the output monitors $24_1$ to $24_N$, the power of the branched lights from the optical couplers $23_1$ to $23_N$ is respectively measured, and signals indicating each of the measurements results are output to the control circuits $25_1$ to $25_N$. In the control circuits $25_1$ to $25_N$, based on the measurement results of the output monitors $24_1$ to $24_N$, the total power of the signal lights output from each of the optical amplifier sections $12_1$ to $12_N$ is determined. Moreover, control signals are generated that adjust each of the gains of the optical amplifier sections $12_1$ to $12_N$ so that the output optical power thereof becomes constant at a preset level, even when level fluctuations occur which do not accompany channel number changes in the WDM signal light input to the demultiplexer 11, and are respectively output to each of the optical amplifier sections $12_1$ to $12_N$. In each of the optical amplifier sections $12_1$ to $12_N$, the supply power of pumping light to each amplification medium is adjusted according to the control signal from the control circuits $25_1$ to $25_N$.

In this manner, even when constant output control is performed on each of the optical amplifier sections $12_1$ to $12_N$ by respectively adjusting the gain of each of the optical amplifier sections $12_1$ to $12_N$ in correspondence with the level fluctuations in the WDM signal light input to the optical amplifier 1, since each bandwidth $\Delta\lambda_{P1}$ to $\Delta\lambda_{PN}$ of the demultiplexer 11 is optimized in consideration of the gain wavelength characteristic of each of the optical amplifier sections $12_1$ to $12_N$, the deviation in the optical output level of each of the optical amplifier sections $12_1$ to $12_N$ is suppressed to within the range of approximately 1 dB as shown in FIG. 5 mentioned above. Moreover, by combining the signal light output from each of the optical amplifier sections $12_1$ to $12_N$ in the multiplexer 13, WDM signal light that has a flat wavelength characteristic in which the output power level is controlled to within a preset range is generated, and this WDM signal light is output to the outside from the output terminal OUT.

As described above, according to the optical amplifier 1 of the first embodiment, the bandwidth $\Delta\lambda_{P1}$ to $\Delta\lambda_{PN}$ of the signal light output from each of the output ports $P_1$ to $P_N$ of the demultiplexer 11 is optimized according to the gain wavelength characteristic of each of the optical amplifier sections $12_1$ to $12_N$, and constant output control is performed on each of the optical amplifier sections $12_1$ to $12_N$ by adjusting the gain of each of the optical amplifier sections $12_1$ to $12_N$ in correspondence with fluctuations in the input signal level of the WDM signal light, so that an amplified output in which level deviation is suppressed over the entire wavelength bandwidth of the WDM signal light can be acquired with a simple configuration that does not require a conventional variable optical attenuator for level adjustment.

Moreover, since the optical amplifier sections $12_1$ to $12_N$ and the optical couplers $23_1$ to $23_N$ are detachably provided using connectors or the like, on each of the optical paths between the demultiplexer 11 and the multiplexer 13, optical amplifier sections can be easily added or removed according to the number of signal channels. Therefore, for example even in the case where operation with a few signal channels is anticipated when initially implemented, then by considering the bandwidth $\Delta\lambda_{P1}$ to $\Delta\lambda_{PN}$ of the demultiplexer 11 and providing optical amplifier sections only to the output ports corresponding to the minimum bandwidth in which operation channels can be accommodated, the equipment cost can be reduced. Moreover, if additional optical amplifier sections are installed in accordance with an increase in demand for transmission capacity, it becomes possible to perform efficient capital investment. Specifically, when operating up to 16 waves in an optical amplifier having channels for a maximum of 80 waves, the optical amplifier 1 of the present embodiment can be realized at approximately 60% of the cost that is required for an optical amplifier of the conventional configuration.

Furthermore, in the description of the first embodiment it was assumed to use EDFAs having the same gain wavelength characteristic, for each of the optical amplifier sections $12_1$ to $12_N$. However arbitrary optical amplifiers having different gain wavelength characteristics can be used for each of the optical amplifier sections $12_1$ to $12_N$. Also in this case, information relating to the gain wavelength characteristics of each of the optical amplifier sections $12_1$ to $12_N$ may be acquired beforehand, and then based on this information, the bandwidths $\Delta\lambda_{P1}$ to $\Delta\lambda_{PN}$ of the signal light output from each of the output ports $P_1$ to $P_N$ of the demultiplexer 11 may be individually optimally designed.

Figure 6:
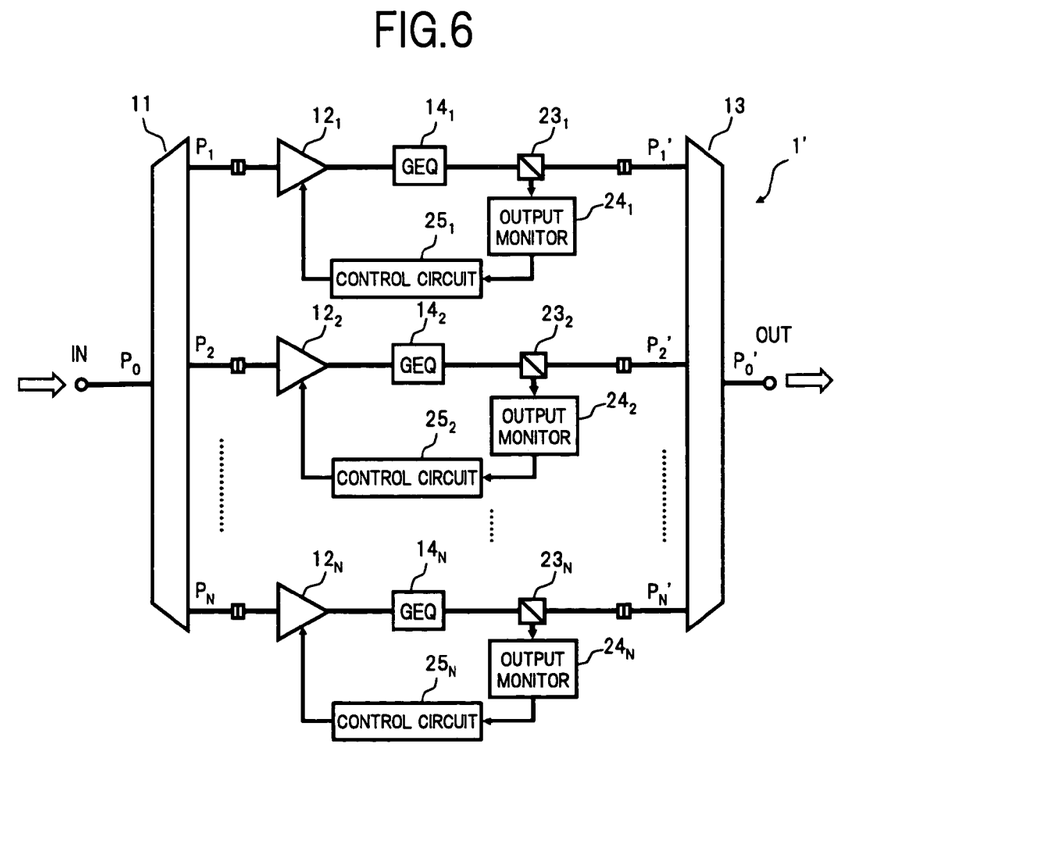
FIG. 6 is a block diagram showing another configuration example in relation to the first embodiment.

Moreover, each bandwidth $\Delta\lambda_{P1}$ to $\Delta\lambda_{PN}$ of the demultiplexer 11 was optimized and the deviation in the optical output level was suppressed to within a preset range (for example, approximately 1 dB). However as shown in the optical amplifier 1' of FIG. 6, gain equalizers (GEQ) $14_1$ to $14_N$ may be respectively disposed on each optical path between the demultiplexer 11 and the multiplexer 13, and the gain deviation that occurs in each of the optical amplifier sections $12_1$ to $12_N$ when the WDM signal light at reference level is input, may be compensated by the corresponding gain equalizers $14_1$ to $14_N$, so that the inter-wavelength deviation in the optical output level that occurs when the optical input level changes from the reference level may be compensated by the configuration of the present invention.

Next, a second embodiment of the present invention is described.

Figure 7:
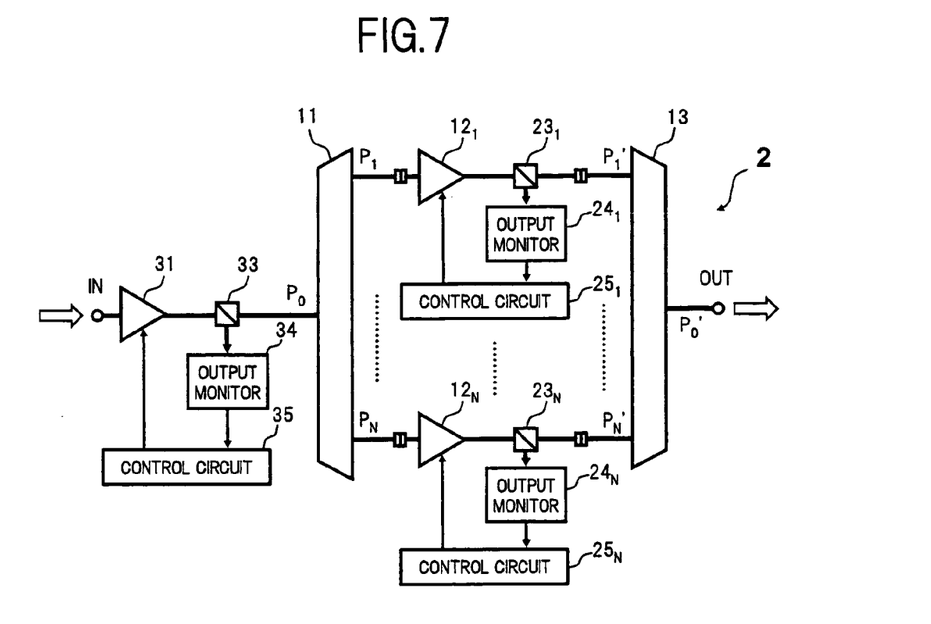
FIG. 7 is a block diagram showing the configuration of an optical amplifier of a second embodiment of the present invention.

FIG. 7 is a block diagram showing the configuration of an optical amplifier of the second embodiment of the present invention.

In FIG. 7, the difference between the configuration of the optical amplifier 2 of the second embodiment and the configuration of the optical amplifier 1 of the first embodiment described above (FIG. 1) is that a pre-stage optical amplifier section 31, an optical coupler 33, an output monitor 34, and a control circuit 35 are disposed between the input terminal IN and the demultiplexer 11. The configuration of parts other than the above mentioned is the same as that of the first embodiment, and hence specific description thereof is omitted here.

The pre-stage optical amplifier section 31 is configured with a commonly known optical amplifier that is capable of collectively amplifying WDM signal light provided to the input terminal IN. One part of the output light from the pre-stage optical amplifier section 31 is branched in the optical coupler 33 and sent to the output monitor 34. In the output monitor 34 the power of the branched light from the optical coupler 33 is measured, and a signal indicating the measurement result is output to the control circuit 35. The operation of this pre-stage optical amplifier section 31 is constant output controlled in accordance with a control signal sent from the control circuit 35. Specific examples of the aforementioned pre-stage optical amplifier section 31 include; a rare-earth-doped optical fiber amplifier, a semiconductor optical amplifier (SOA), and the like.

Figure 8:
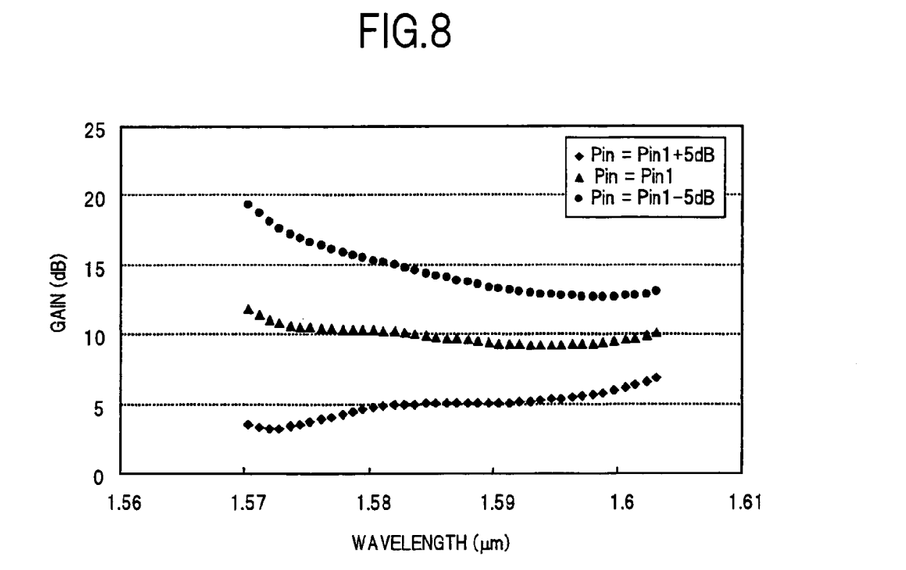
FIG. 8 is a graph showing one example of the gain wavelength characteristic of a pre-stage optical amplifier section used in the second embodiment.

In the present embodiment, by disposing such a pre-stage optical amplifier section 31 at the first stage of the demultiplexer 11, design of each bandwidth $\Delta\lambda_{P1}$ to $\Delta\lambda_{PN}$ of the demultiplexer 11 and setting of the gain of each of optical amplifier sections $12_1$ to $12_N$ are performed in consideration of the gain wavelength characteristic of the pre-stage optical amplifier section 31 and the gain wavelength characteristic of each of the optical amplifier sections $12_1$ to $12_N$, so that deviation in optical output level of the entire optical amplifier 2 falls within a preset range. Specifically, the above content is described in detail here, assuming for example a case where the pre-stage optical amplifier section 31 has gain wavelength characteristics such as shown in FIG. 8. However, this is not to imply that the gain wavelength characteristics of the pre-stage optical amplifier section 31 of the present invention are limited to the example of FIG. 8.

Figure 9:
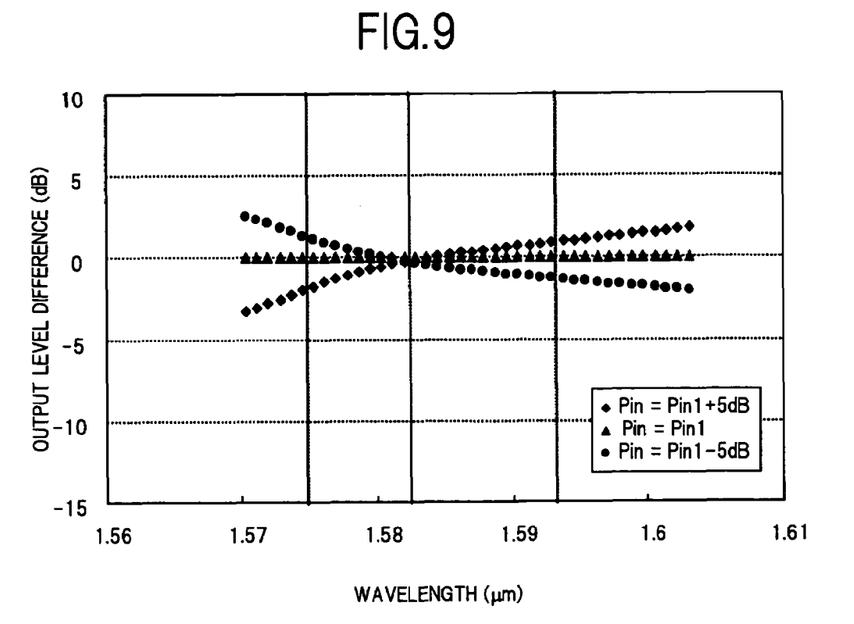
FIG. 9 is a graph relatively showing the wavelength characteristic of optical output level according to a change in optical input level, for a pre-stage optical amplifier section having the gain wavelength characteristics of FIG. 8.

The gain wavelength characteristics shown in FIG. 8 are one example of the case where gain of the pre-stage optical amplifier section 31 has been adjusted to have a constant optical output level, with the total power Pin of the WDM signal light input to the pre-stage optical amplifier section 31 as Pin1−5 dB, Pin1, and Pin1+5 dB. For a pre-stage optical amplifier section 31 having such gain wavelength characteristics, taking the optical output level when the optical input level is Pin=Pin1 as a reference, the differences of the optical output levels at Pin=Pin1±5 dB with respect to the reference are obtained to thereby acquire the relationship of output level difference with respect to wavelength as shown in FIG. 9. In the present embodiment, the aforementioned wavelength dependency of the optical output level with respect to variation in the optical input level for the pre-stage optical amplifier section 31 is compensated by optical amplification at each of the post-stage optical amplifier sections $12_1$ to $12_N$.

Figure 10:
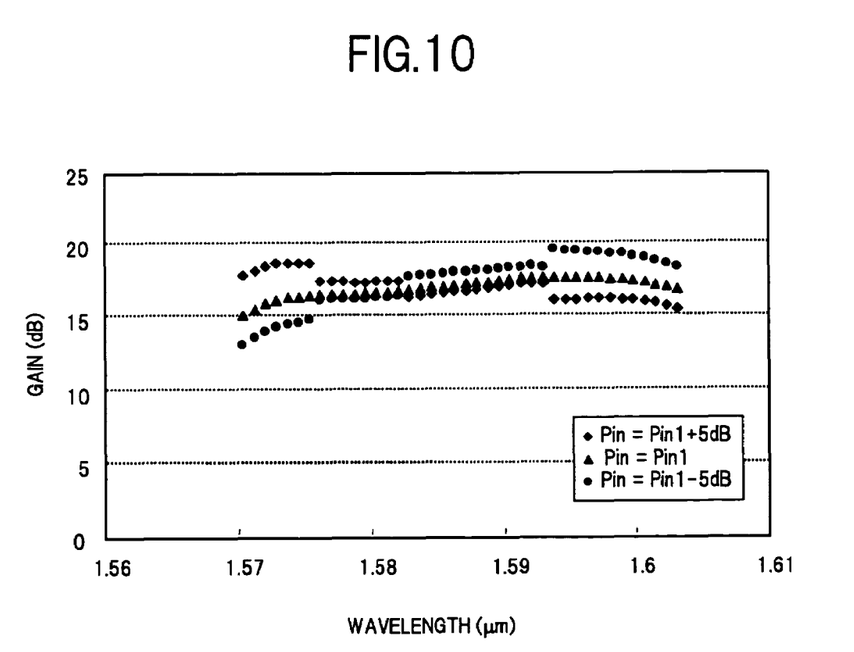
FIG. 10 is a graph showing one example of a gain setting of each pre-stage optical amplifier section in the second embodiment.

In order to achieve this, first of all, at the stage of determining; how many parts the WDM signal light output from the pre-stage optical amplifier section 31 is to be separated into by the demultiplexer 11 (the number N of output ports of the demultiplexer 11), and the gain wavelength characteristics of the optical amplifiers used for each of the optical amplifier sections $12_1$ to $12_N$, each bandwidth $\Delta\lambda_{P1}$ to $\Delta\lambda_{PN}$ of the demultiplexer 11 is appropriately designed as with the case of the aforementioned first embodiment. Then, when each bandwidth $\Delta\lambda_{P1}$ to $\Delta\lambda_{PN}$ of the demultiplexer 11 has been determined, the gain of each of the optical amplifier sections $12_1$ to $12_N$ is set for example in correspondence with the optical input Pin as shown in FIG. 10. As a result, the wavelength dependency of the optical output level of the aforementioned pre-stage optical amplifier section 31 shown in FIG. 9 is compensated by optical amplification in each of the optical amplifier sections $12_1$ to $12_N$.

Figure 11:
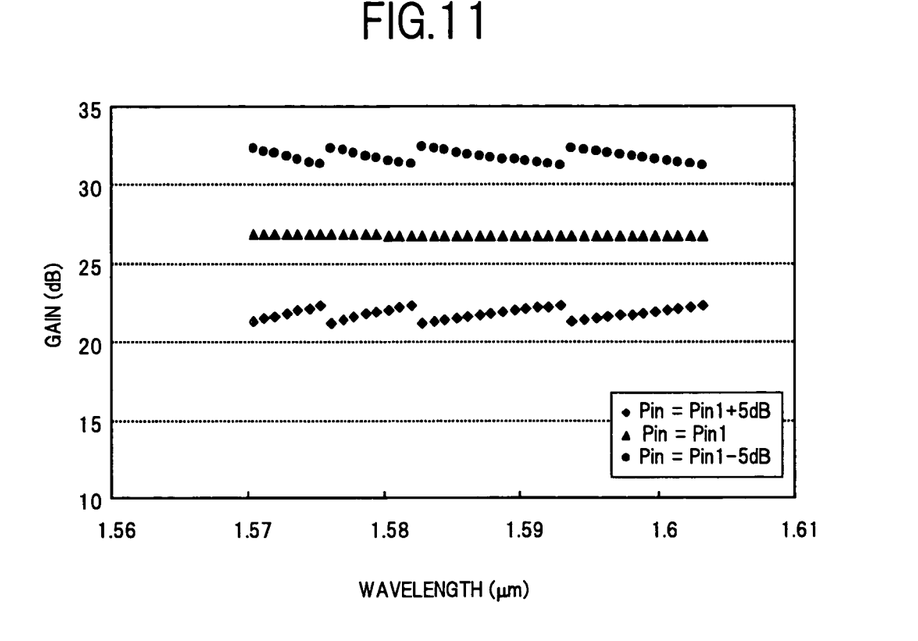
FIG. 11 is a graph showing one example of the entire gain wavelength characteristics for a combination of the pre-stage optical amplifier section and each optical amplifier section in the second embodiment.
Figure 12:
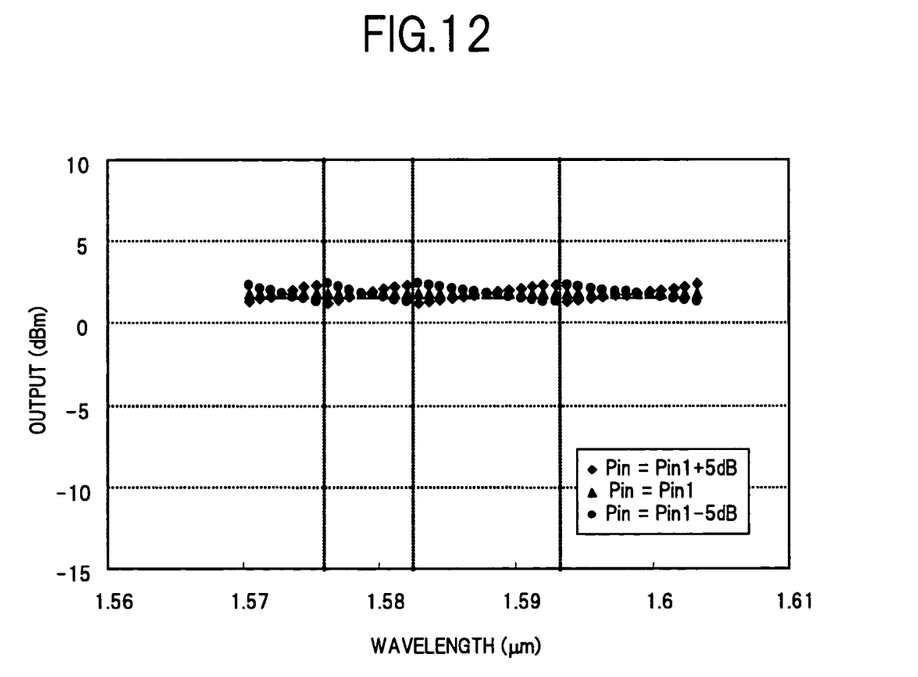
FIG. 12 is a graph showing one example of deviation in optical output level over an entire wavelength bandwidth of WDM signal light output from the optical amplifier of the second embodiment.

By setting the gain of each of the optical amplifier sections $12_1$ to $12_N$ as shown in FIG. 10, the entire gain wavelength characteristic of the combination of the pre-stage optical amplifier section 31 and each of the optical amplifier sections $12_1$ to $12_N$ becomes that shown in FIG. 11. Therefore, the WDM signal light output from the output terminal OUT of the present optical amplifier 2 is controlled to be at a constant level with respect to the input dynamic range (Pin1±5 dB) as shown in FIG. 12, and the deviation in the optical output level over all the wavelength bandwidths is suppressed to within a narrow range of approximately 1 dB.

In the above manner, according to the optical amplifier 2 of the second embodiment, by providing the pre-stage optical amplifier section 31, the loss and the like that occurs in the demultiplexer 11 is compensated by the pre-stage optical amplifier section 31. Therefore the NF characteristic of the optical amplifier 2 can be improved. Moreover, since the gain wavelength characteristic that occurs in the pre-stage optical amplifier section 31 is compensated by optical amplification in each of the post-stage optical amplifier sections $12_1$ to $12_N$, then as with the first embodiment, amplified output in which the level deviation is suppressed over all the wavelength bandwidths of the WDM signal light can be acquired.

In the second embodiment a configuration is shown where the gain characteristic that occurs in the pre-stage optical amplifier section 31 is compensated by each of the optical amplifier sections $12_1$ to $12_N$. However the invention is not limited to this, and for example, a gain equalizer may be provided at the output stage of the pre-stage optical amplifier section 31, and the gain characteristic that occurs in the pre-stage optical amplifier section 31 may be compensated by this gain equalizer. In this case, the setting of the gain of each of the optical amplifier sections $12_1$ to $12_N$ may be done as with the case of the first embodiment. Moreover, the case is described where the pre-stage optical amplifier section 31 is constant output controlled with respect to variations in the optical input level. However, the pre-stage optical amplifier section may be constant gain controlled. In this case, the gain wavelength characteristic of the constant gain controlled pre-stage optical amplifier section 31 is substantially constant with respect to variation in the optical input level. Therefore compensation of the gain wavelength characteristic thereof may be performed using a fixed gain equalizer.

Next, a third embodiment of the present invention is described.

Figure 13:
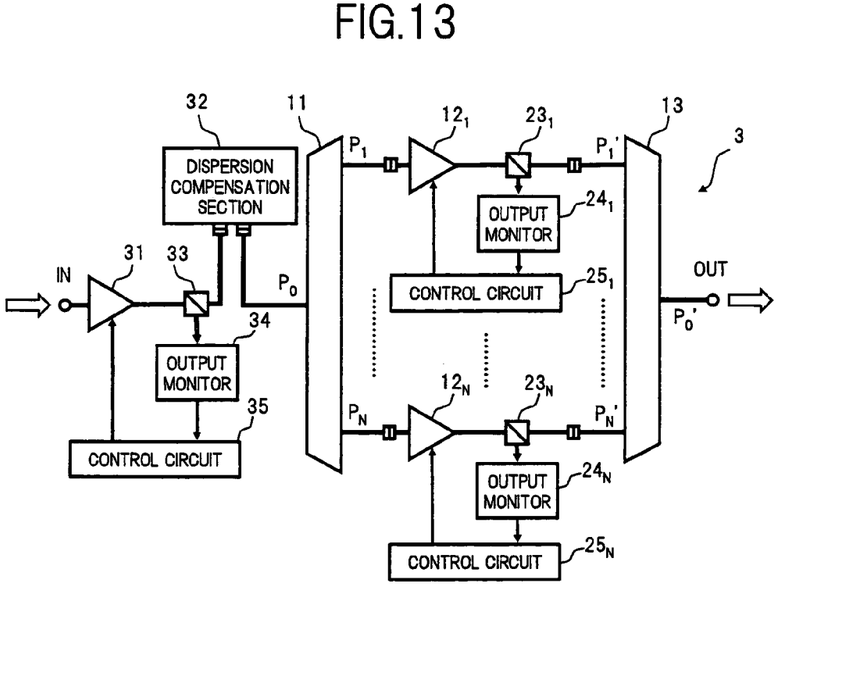
FIG. 13 is a block diagram showing the configuration of an optical amplifier of a third embodiment of the present invention.

FIG. 13 is a block diagram showing the configuration of an optical amplifier of the third embodiment of the present invention.

In FIG. 13, an optical amplifier 3 of the third embodiment is an adaptation example of the aforementioned optical amplifier 2 of the second embodiment, in which a dispersion compensation section 32 is provided on the optical path between the optical coupler 33 and the demultiplexer 11.

The dispersion compensation section 32 is configured for example using a dispersion compensation fiber (DCF) or a fiber grating, provided with a reverse wavelength dispersion characteristic to the wavelength dispersion characteristic of the optical transmission path (not shown in the diagram) that is connected to the present optical amplifier 3. Here, this dispersion compensation section 32 is detachable attached on the optical path between the optical coupler 33 and the demultiplexer 11, via connectors.

According to the optical amplifier 3 of the configuration described above, wavelength dispersion occurring in the WDM signal light that is provided to the input terminal IN can be compensated by the dispersion compensation section 32. Moreover, since this dispersion compensation section 32 is detachably provided using connectors, it is possible to flexibly correspond to the necessity for executing wavelength dispersion compensation, and changes in compensation amount and the like.

Figure 14:
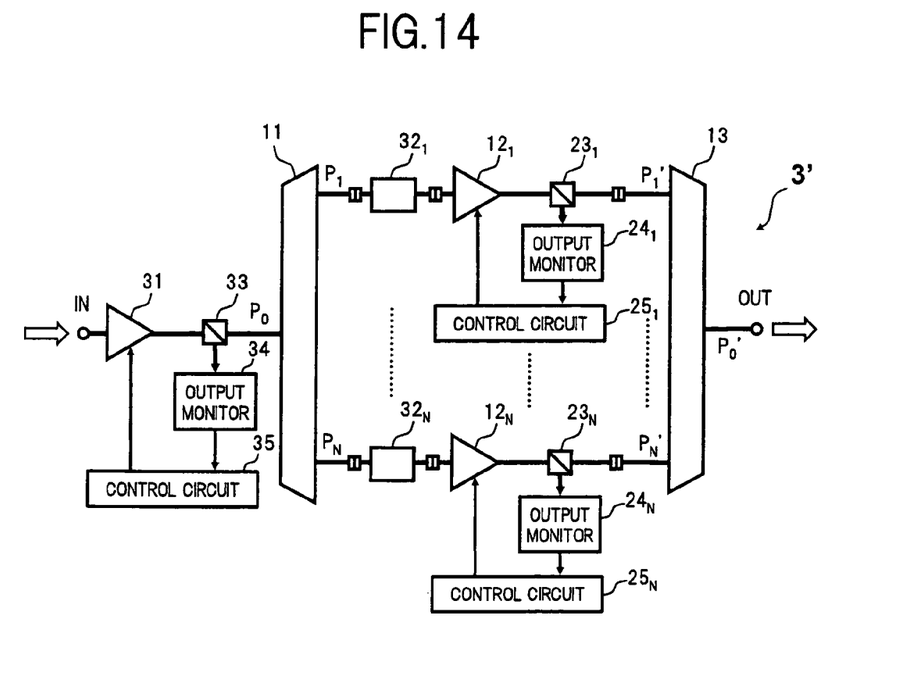
FIG. 14 is a block diagram showing another configuration example associated with the third embodiment.

In the third embodiment described above, one example of providing the dispersion compensation section 32 on the optical path between the optical coupler 33 and the demultiplexer 11 is shown. However, the arrangement of the dispersion compensation section 32 is not limited to that mentioned above, and for example as shown in the optical amplifier 3' of FIG. 14, dispersion compensation sections $32_1$ to $32_N$ may be respectively provided on the optical paths between each of the output ports $P_1$ to $P_N$ of the demultiplexer 11 and each of the optical amplifier sections $12_1$ to $12_N$. Moreover, an application example where the dispersion compensation section 32 is provided in a configuration provided with the pre-stage optical amplifier section 31 is shown. However, the dispersion compensation section can of course be provided for a configuration that is not provided with the pre-stage optical amplifier section 31.

What is claimed is:

1. An optical amplification method which: separates a wavelength division multiplexed signal light including a plurality of signal channels of different wavelengths into signal lights of at least two wavelength bandwidths by a demultiplexer; amplifies each of the separated signal lights of each wavelength bandwidth by optical amplifier sections corresponding to each wavelength bandwidth; controls the total power of the signal lights output from each of the amplifier sections to be constant at a preset level, and multiplexes the constant output controlled signal lights of each wavelength bandwidth by a multiplexer, comprising;

designing the bandwidth of the signal light output from each output port of said demultiplexer to have a different value in accordance with the gain wavelength characteristics of each of said optical amplifier sections, so that inter-wavelength deviation in optical output levels that occur in each of said optical amplifier sections falls within a preset range, and individually adjusting the gain of each of the optical amplifier sections in relation to fluctuations in the power level without channel number changes of the wavelength division multiplexed signal light input to said demultiplexer, so that the signal level of each wavelength of the wavelength division multiplexed signal light that is multiplexed by said multiplexer is within a preset range.

2. An optical amplification method according to claim 1, wherein the wavelength division multiplexed signal light input to said demultiplexer is collectively amplified by a pre-stage optical amplifier section, and the amplified wavelength division multiplexed signal light is provided to said demultiplexer.

3. An optical amplification method according to claim 2, wherein the gain of said pre-stage optical amplifier section is adjusted in relation to fluctuations in the power level without channel number changes of the wavelength division multiplexed signal light input to said pre-stage optical amplifier section, to thereby control the total power of the wavelength division multiplexed signal light output from said pre-stage optical amplifier section, to be constant, and the gain setting of each of said optical amplifier sections is individually adjusted to thereby compensate inter-wavelength deviation in optical output levels that occur in said pre-stage optical amplifier section, and make the signal level of each wavelength of the wavelength division multiplexed signal light that is multiplexed by said multiplexer become within a preset range.

4. An optical amplification method according to claim 2, wherein the gain of said pre-stage optical amplifier section is controlled to become constant in relation to fluctuations in the power level without channel number changes of the wavelength division multiplexed signal light input to said pre-stage optical amplifier section, and the gain of each of said optical amplifier sections is individually adjusted to thereby make the signal level of each wavelength of the wavelength division multiplexed signal light that is multiplexed by said multiplexer become within a preset range.

5. An optical amplifier comprising:

a demultiplexer that separates a wavelength division multiplexed signal light including a plurality of signal channels of different wavelengths into signal lights of at least two wavelength bandwidths, and respectively outputs the signals lights from output ports corresponding to each of said wavelength bandwidths;

a plurality of optical amplifier sections that respectively amplify signal lights output from each output port of said demultiplexer;

a multiplexer that multiplexes signal lights output from each of said optical amplifier sections; and a plurality of control sections that control the total power of the signal light output from each of said optical amplifier sections to be constant at a preset level, wherein in said demultiplexer, the bandwidth of the signal light output from each of the output ports is designed to have a different value according to the gain wavelength characteristics of each of said optical amplifier sections, so that inter-wavelength deviation in the optical output level that occurs in each of said optical amplifier sections, falls within a preset range, and each of said control sections individually adjusts the gain of each of said optical amplifier sections in relation to fluctuations in the power level without channel number changes of the wavelength division multiplexed signal light input to said demultiplexer, to thereby make the signal level of each wavelength of the wavelength division multiplexed signal light that is multiplexed by said multiplexer, be within a preset range.

6. An optical amplifier according to claim 5, wherein said optical amplifier sections each include at least one of a rare-earth-doped optical fiber amplifier and a semiconductor optical amplifier.

7. An optical amplifier according to claim 5, wherein said optical amplifier sections are detachably provided on each of optical paths which connect between each of the output ports of said demultiplexer and each of the input ports of said multiplexer.

8. An optical amplifier according to claim 5, wherein each of said optical amplifier sections, at the time of initial implementation, is only provided on an optical path connected to an output port of said demultiplexer, which corresponds to a minimum bandwidth in which operation channels can be accommodated.

9. An optical amplifier according to claim 5, wherein there is provided a pre-stage optical amplifier section which collectively amplifies the wavelength division multiplexed signal light input to said demultiplexer, and a control circuit which controls said pre-stage optical amplifier section.

10. An optical amplifier according to claim 9, wherein
said control circuit adjusts the gain of said pre-stage optical amplifier section in relation to fluctuations in the power level without channel number changes of the wavelength division multiplexed signal light input to said pre-stage optical amplifier section, to thereby control the total power of the wavelength division multiplexed signal light output from said pre-stage optical amplifier section, to be constant, and each of said control sections individually adjusts the gain setting of each of said optical amplifier sections to thereby compensate inter-wavelength deviation in optical output levels that occur in each of said pre-stage optical amplifier sections, and make the signal level of each wavelength of the wavelength division multiplexed signal light that is multiplexed by said multiplexer, be within a preset range.

11. An optical amplifier according to claim 9, wherein
said control circuit controls the gain of said pre-stage optical amplifier section to be constant in relation to fluctuations in the power level without channel number changes of the wavelength division multiplexed signal light input to said pre-stage optical amplifier section, and each of said control sections individually adjusts the gain of each of said optical amplifier sections to thereby make the signal level of each wavelength of the wavelength division multiplexed signal light that is multiplexed by said multiplexer, be within a preset range.

12. An optical amplifier according to claim 9, wherein said pre-stage optical amplifier section includes at least one of a rare-earth-doped optical fiber amplifier and a semiconductor optical amplifier.

13. An optical amplifier according to claim 5, wherein there is provided a gain equalizer for compensating for a inter-wavelength deviation in optical output levels, which occurs in each of said optical amplifier sections when the input level of said wavelength division multiplexed signal light corresponds to a preset reference level.

14. An optical amplifier according to claim 5, wherein there is provided a dispersion compensation section which compensates for wavelength dispersion occurring in said wavelength division multiplexed signal light.

15. An optical amplifier according to claim 14, wherein said dispersion compensation section is configured using a dispersion compensation fiber.

16. An optical amplifier according to claim 14, wherein said dispersion compensation section is configured using a fiber grating.

17. An apparatus comprising:
a demultiplexer having output ports corresponding, respectively, to wavelength bands, the demultiplexer receiving a wavelength division multiplexed (WDM) signal light, separating the received WDM signal light into a plurality of signal lights each of which is included a respective wavelength band of said wavelength bands, and outputting each signal light from the output port corresponding to the wavelength band which includes the signal light;
optical amplifiers corresponding, respectively, to the output ports, each optical amplifier amplifying signals lights output from the corresponding output port by the demultiplexer, and outputting the amplified signal lights;
power circuitry controlling a total power of the amplified signal lights output from each of the optical amplifiers to be constant at a preset level;
a multiplexer multiplexing together the amplified signal lights output by the optical amplifiers and having a controlled total power into a WDM optical signal which is output from the multiplexer; and
gain control circuitry controlling gain of each of the optical amplifiers according to fluctuations in power level without channel number changes of the WDM signal light received by the demultiplexer, to make a signal level of each wavelength of the WDM signal light output from the multiplexer to be within a preset range,
wherein each of the output ports has a bandwidth which is set in accordance with a gain wavelength characteristic of the respective optical amplifier corresponding to the output port so that inter-wavelength deviation in optical output level occurring in each of the optical amplifiers falls within a preset range.

18. An apparatus comprising:
a demultiplexer having output ports corresponding, respectively, to wavelength bands, each of the output ports having a corresponding bandwidth, the demultiplexer receiving a wavelength division multiplexed (WDM) signal light, separating the received WDM signal light into a plurality of signal lights each of which is included a respective wavelength band of said wavelength bands, and outputting each signal light from the output port corresponding to the wavelength band which includes the signal light;

optical amplifiers corresponding, respectively, to the output ports, each optical amplifier amplifying signals lights output from the corresponding output port by the demultiplexer, and outputting the amplified signal lights;

means for controlling a total power of the amplified signal lights output from each of the optical amplifiers to be constant at a preset level;

a multiplexer multiplexing together the amplified signal lights output by the optical amplifiers and having a controlled total power into a WDM optical signal which is output from the multiplexer;

means for controlling gain of each of the optical amplifiers according to fluctuations in power level without channel number changes of the WDM signal light received by the demultiplexer, to make a signal level of each wavelength of the WDM signal light output from the multiplexer to be within a preset range; and means for setting the bandwidth of each output port in accordance with a gain wavelength characteristic of the respective optical amplifier corresponding to the output port so that inter-wavelength deviation in optical output level occurring in each of the optical amplifiers falls within a preset range.

\* \* \* \* \*

UNITED STATES PATENT AND TRADEMARK OFFICE
CERTIFICATE OF CORRECTION

PATENT NO. : 7,119,950 B2
APPLICATION NO. : 11/085082
DATED : October 10, 2006
INVENTOR(S) : Chihiro Ohshima It is certified that error appears in the above-identified patent and that said Letters Patent is hereby corrected as shown below:

Column 12, Line 63, change "signals" to --signal--.

Column 14, Line 35, change "signals" to --signal--.

Column 15, Line 4, change "signals" to --signal--.

Signed and Sealed this

Twentieth Day of February, 2007

JON W. DUDAS
*Director of the United States Patent and Trademark Office*